United States Patent [19]

Peterson

[11] 4,325,011

[45] Apr. 13, 1982

[54] PULSE WIDTH MODULATION CONTROL CIRCUIT

[76] Inventor: Donovan F. Peterson, 655 Meadow La., Elm Grove, Wis. 53122

[21] Appl. No.: 117,257

[22] Filed: Jan. 31, 1980

[51] Int. Cl.³ .............................................. H02P 5/16
[52] U.S. Cl. ................................. 318/345 B; 318/139; 318/331; 318/341
[58] Field of Search .............. 318/543, 549, 628, 587, 318/139, 55–60, 341, 257, 331, 345 B; 180/6.5, DIG. 3; 331/108 A, 111

[56] References Cited

U.S. PATENT DOCUMENTS

| | | | |
|---|---|---|---|
| 3,046,494 | 7/1962 | Root | 331/111 |
| 3,054,970 | 9/1962 | Lace | 331/111 |
| 3,351,148 | 11/1967 | Solomon | 180/6.5 |
| 3,422,331 | 1/1969 | Kearns | 318/345 B |
| 3,448,298 | 6/1969 | Peterson | 307/303 |
| 3,681,620 | 8/1972 | Hoge | 318/341 |
| 3,854,079 | 12/1974 | Brown | 318/341 |
| 3,989,992 | 11/1976 | Schmidt | 318/341 |
| 4,059,786 | 11/1977 | Jones et al. | 180/DIG. 3 |

*Primary Examiner*—David Smith, Jr.
*Attorney, Agent, or Firm*—Andrus, Sceales, Starke & Sawall

[57] ABSTRACT

A control circuit providing pulse width modulated energization to a load from a d.c. power source has a pair of input terminals connected to the source and a pair of output terminals connected to the load. A potentiometer provides a variable magnitude control signal. A first transistor has the base terminal connected to the potentiometer. The collector terminal is connected through a first resistor to the positive voltage input terminal. The emitter terminals is connected to one of the output terminals. A second transistor has its base terminal connected intermediate the first resistor and the collector terminal of the first transistor. The emitter of the second transistor is connected to the positive voltage input terminal. The collector is connected through a second resistor to the one of the output terminals. A capacitor is connected in between the collector terminal of the second transistor and the base of the first transistor. A third transistor has the collector connected to the positive terminal and the emitter connected to the one output terminal. The base is connected intermediate the second resistor and the collector of the second transistor. The control circuit may be incorporated in a bridge circuit providing bi-directional speed control to a d.c. motor.

33 Claims, 2 Drawing Figures

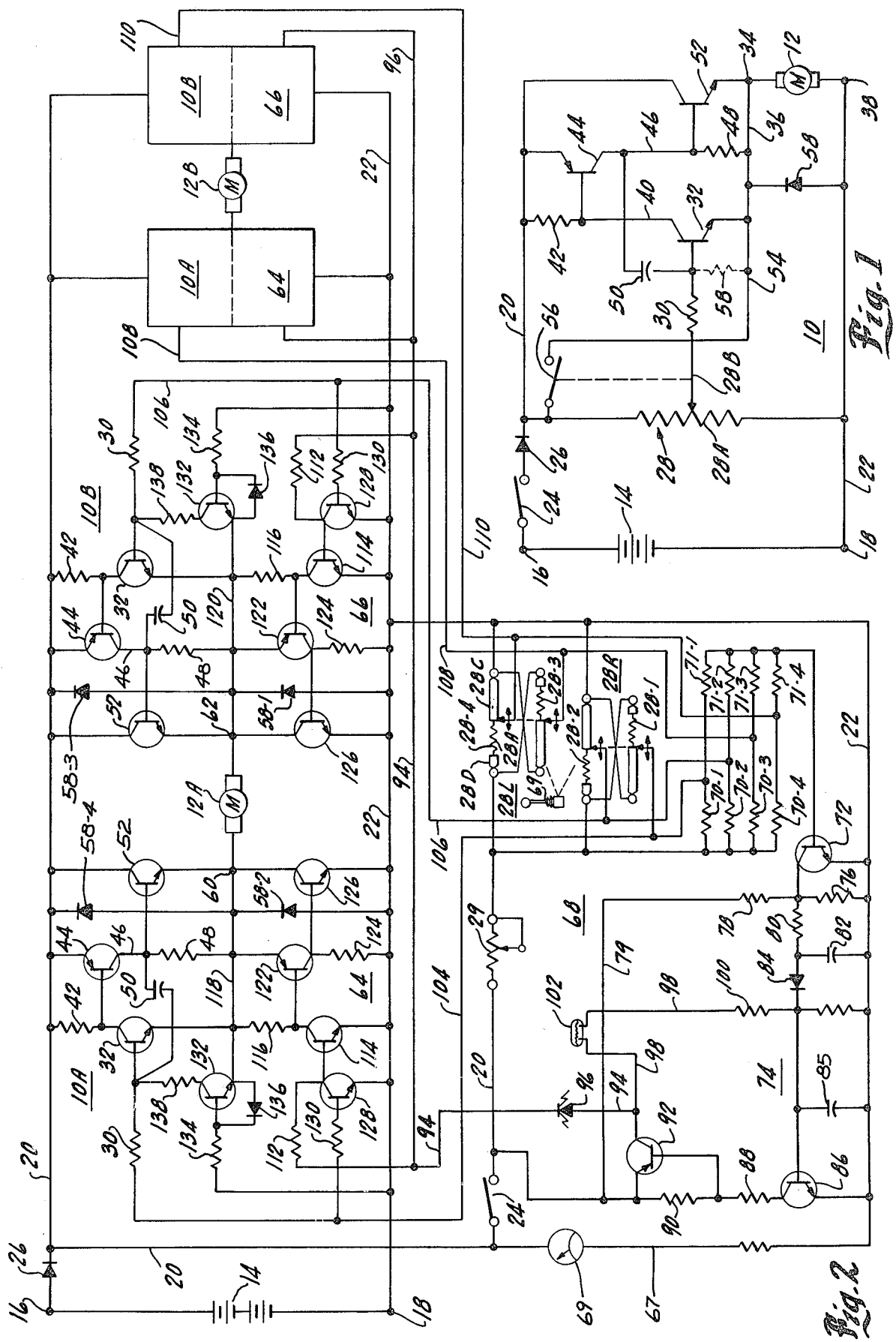

PULSE WIDTH MODULATION CONTROL CIRCUIT

BRIEF SUMMARY OF THE INVENTION

The present invention relates to a control circuit providing energization in the form of automatic pulse width modulation to an electrical load in response to a d.c. control voltage. The control circuit may be typically utilized to energize a d.c. load, such as a motor, from a power source, such as a battery, with pulses having both variable width and frequency. At the maximum power condition, pulse width modulation discontinues and full time current energization commences.

The circuit is highly efficient. The power losses are low in that essentially all current from the power source is provided through the load as energizing current, with the exception of that needed to establish the power controlling d.c. voltage signal. In the case of a motor, or similar load, the pulse width can be established in accordance with the operative condition of the motor, providing sensitive and accurate control to the motor.

The circuit may be incorporated in a drive for a wheelchair having electric motors. Such a wheelchair drive features control of both accelerating and decelerating torques in both rotary directions of the motor. The drive may be all solid state without mechanical switches or relays for directional control of the motor. The drive utilizes unique joy stick operated quadrature potentiometers and is so constructed that it cannot be energized unless the joy stick is in the neutral condition.

The braking provided to the motors may be dynamic if the joy stick is in the zero speed setting or may be reverse torque braking if the joy stick is moved in a direction opposite the rotation of the motor. The control may operate over a wide range of power source voltages. Similarly, the control is capable of handling locked rotor motor conditions as well as the current produced by applying reverse current energization to motors rotating in the opposite direction.

Briefly, the control circuit of the present invention extends between a pair of input terminals connected to the power source and a pair of output terminals connected to the d.c. load. Three transistors have their emitter-collector circuits extending between one of the input terminals and one of the output terminals. The first transistor has been the base terminal connected to a control signal generating means, such as a potentiometer. The second transistor has the base connected to the collector of the first transistor. The collector circuit of the second transistor includes a resistor. A capacitor is connected between the collector of the second transistor and the base of the first transistor. The third transistor has the base-emitter junction connected across the resistor.

A pair of control circuits may be incorporated in a bridge configuration also containing semiconductor switches. The bridge provides bi-directional current to a load such as a d.c. motor responsive to a control signal generator that energizes one or the other of the control circuits. A pair of bridge circuits may be utilized to drive the wheels of the wheelchair.

BRIEF DESCRIPTION OF THE DRAWING

FIG. 1 is a schematic diagram of the improved circuitry of the present invention.

FIG. 2 is a schematic diagram of a control for a motorized wheelchair incorporating the improved circuitry of the present invention.

DETAILED DESCRIPTION OF THE PREFERRED EMBODIMENT

The circuitry for pulse width modulation of an electrical load is indicated by the numeral 10 in FIG. 1. Circuit 10 is shown as energizing an electric load comprising d.c. motor 12 from an electrical power source comprising battery 14. The input terminals 16 and 18 of circuit 10 are connected across battery 14. Terminals 16 and 18 are connected to a pair of buses 20 and 22, respectively. On-off switch 24 is connected in bus 20 in series with a reverse voltage protection means, such as diode 26.

A control signal generating means includes potentiometer 28.

The resistive element 28a of potentiometer 28 is connected across buses 20 and 22. The wiper 28b of potentiometer 28, providing a control signal, is connected through resistor 30 to the base of the transistor 32. Other control signal means, such as operational amplifiers, providing a d.c. signal may be used, if desired.

A controllable current conduction means, such as transistor 32, which may be of the NPN type, has the emitter connected to output terminal 34 and motor 12 by conductor 36. The other output terminal of control circuit 10 is indicated by the numeral 38. The collector of transistor 32 is connected to bus 20 by the conductor 40 through resistor 42.

A second controllable current conduction means, such as transistor 44, which may be of the PNP type, has the emitter connected to bus 20. The base of transistor 44 is connected to conductor 40 intermediate resistor 42 and the collector of transistor 32. The collector of transistor 44 is connected through conductor 46 and resistor 48 to conductor 36. Resistor 48 is of relatively low resistance. Coupling means such as capacitor 50 is connected between the base of transistor 32 and the collector of transistor 44.

The collector of a third current conduction means such as transistor 52, which may be of the NPN type, is connected to bus 20 and may be heat sinked if required. The emitter of transistor 52 is connected to output terminal 34. The base of transistor 52 is connected to conductor 46 and capacitor 50 intermediate the collector of transistor 44 and resistor 48. Conductor 54 is connected between conductor 36 and bus 20, with switch 56 interposed in conductor 54. Switch 56 may form a portion of potentiometer 28 or may be a separate element.

Transistors 32, 44, and 52 may all be of the same semiconductor type, such as silicon.

The operation of circuit 10 to energize motor 12 is as follows. On-off switch 24 is closed. With the circuitry as shown in FIG. 1, wiper 28b of potentiometer 28 is moved upward from the negative end of resistive element 28. This provides a voltage on wiper 28b that is positive with respect to the voltage existing in bus 22.

A current path is established from bus 22, output terminal 38, load 12, output terminal 34, conductor 36, resistor 48, conductor 46, capacitor 50, and resistor 30 to wiper 28b of potentiometer 28. Capacitor 50 charges until it reaches a voltage equal to the intrinsic base-emitter voltage of transistor 32. This renders transistor 32 conductive. With transistor 32 conductive, the voltage across capacitor 50 and resistor 48 is limited to the base-emitter voltage of transistor 32. Because of the low resistance of resistor 48 most of the voltage will be across capacitor 50. When this voltage is reached, it terminates current flow through resistor 48 and capacitor 50. As noted below, this termination of current flow is only momentary.

With transistor 32 conductive, a current path exists through the base-emitter junction of transistor 32. A current path also exists through the emitter-collector of transistor 32, conductor 40, and resistor 42 to bus 20. The voltage developed across resistor 42 renders transistor 44 conductive.

With transistor 44 conductive, an increased current appears in conductor 46 through the emitter-collector path of transistor 44. This increases the current through resistor 48 and load 12 many times. The increased current increases the voltage across resistor 48, setting up a new charging condition for capacitor 50 and resuming current flow to the capacitor. The step function change brought about by the increase in voltage across resistor 48, is momentarily applied across the base-emitter junction of transistor 32 and drives transistor 32 completely into saturation. Thereafter capacitor 50 starts to discharge.

When the voltage drop across resistor 48, due to the increased current, reaches the intrinsic base-emitter voltage of transistor 52, transistor 52 is rendered conductive. The turn-on transistor 52 completes the application of battery voltage across motor 12, less the small voltage drop in transistor 52. The circuitry is now in the "on" condition and the pulse has commenced.

Capacitor 50 and resistor 48 act as a positive feedback means to couple a portion of the output of transistor 32 back to its input. Capacitor 50 and resistor 48 also act as an input filter to prevent transistor 32 from turning on due to electrical noise or other spurious signals.

From the foregoing, it will be appreciated that all currents existing in the circuitry go through the load, with the exception of the current through potentiometer 28 necessary to establish the voltage in wiper 28b. Because all currents, with the exception of the small potentiometer current, pass through the load, the circuit is highly efficient. The currents involved include the current to capacitor 50, the base-emitter and the emitter-collector currents of transistor 32, the base-emitter and emitter-collector currents of transistor 40, and the base-emitter and emitter-collector currents of transistor 52. The efficiency of the circuit is further improved by the saturated condition in which transistors 32, 44, and 52 are operated. The excitation by capacitor 50 and the saturation of transistor 32, described above, drive transistors 44 and 52 into their full conductive "on" states.

With transistors 52 rendered conductive, the voltage in positive bus 20 appears at output terminal 34. The voltage similarly appears in conductor 36 in a path extending from output terminal 34 through the base-emitter junction of transistor 32 to resistor 30. This increase in voltage at output terminal 34 reverses the voltage across resistor 30, assuming wiper 28b is not at maximum positive potential. When conductor 36 assumes the positive battery voltage, the bias voltage across resistor 48 is added to the voltage in conductor 36 and is applied through capacitor 50 to the base of transistor 32 in addition to its "on" state base-emitter voltage. After a period of time, capacitor 50 will reequalize for the voltage on wiper 28b through resistance 30 and the bias voltage across resistor 48. This causes the current through the base-emitter junction of transistor 32 to decrease. When the base-emitter hold-on current of transistor 32 decreases to substantially zero, transistor 32 is rendered non-conductive. This, in turn, renders transistors 44 and 52 non-conductive, terminating the pulse to load 12.

It will thus be apparent that the pulse width is determined in part by the capacitance of capacitor 50. It is also determined, in part, by the position of wiper 28 of potentiometer 28 and the relative resistance of potentiometer 28b with respect to resistor 30. If resistor 30 is of low resistance, capacitor 50 will change its charge state rapidly and the pulse width will be small. If the resistance of resistor 30 is large, capacitor 50 will change its charge state more slowly and the pulse width will be wider. Similarly, if the position of wiper 28b is adjusted so that the resistance of the lower portion of potentiometer 28 is small, the charge state of capacitor 50 will change rapidly and the pulse width will be narrow. As the resistance of the lower portion of potentiometer 28 is increased, the pulse width is similarly increased.

When there is no resistance in the upper portion of potentiometer 28 and wiper 28b is near the positive bus, there will be no change in the charge state of capacitor 50 and motor 12 is continuously energized with no pulse width modulation. Conductor 54, connected to conductor 36 and bus 20, contains switch 56. When wiper 28b is at the upper end of resistive element 28a, switch 56 is closed to bypass the electronic portion of circuit 10 and connect battery 14 directly to motor 12 for increased efficiency at maximum potentiometer setting.

The control of pulse width may also be achieved by other means to control the discharge rate of capacitor 50. For example, a resistor 58 may be shunted across the base-emitter junction of transistor 32, as shown in FIG. 1. Other means may be used, if desired.

Upon deenergization of motor 12, the inductive current present in the armature of motor 12 is discharged through free-wheeling diode 58. Assuming rotation has been inparted to motor 12 by pulse energization, the inertia of the armature converts motor 12 to a generator, during pulse off periods. This generates a back e.m.f. in motor 12 of the same polarity as the applied voltage from battery 14 and of a magnitude proportional to the speed of the armature of motor 12.

Transistor 32 is prevented from turning on immediately following the termination of the pulse because the energy storage capacity of capacitor 50 will not allow the base-emitter voltage of transistor 32 to approach its turn-on value. If the back e.m.f. of motor 12 is below the reference potential established by wiper 28b of potentiometer 28, by an amount sufficient to cause capacitor 50 to produce a base-emitter voltage across transistor 32 sufficient to turn on the transistor, the initiation of a pulse, as described above, reoccurs. The motor is reenergized to increase its speed toward that established by the setting of potentiometer 28.

The resumption of the pulse and thus, the frequency of pulse application and pulse width, is carried out in response to both the position of potentiometer 28 and the operative condition of motor 12, lending close control to its operative condition. The turn-off of this subsequent pulse is carried out as described above.

The very high gain and low saturation voltages of the transistors and the substantial independence of pulse width control from battery voltage, permits control circuit 10 to operate over a wide range of battery voltages.

FIG. 2 shows the control circuit 10 of FIG. 1 incorporated in a drive for an electric wheelchair. The wheelchair has motor 12A driving the right wheel of the chair and motor 12B driving the left wheel of the chair. Two control circuits 10 may be connected in two arms of a bridge configuration energizing one of the motors. Two semi-conductor switches are connected in the other arms of the bridge.

For right wheel motor 12A, one arm of the bridge contains control circuit 10A extending between the positive voltage bus 20 and output terminal 60. Another arm of the bridge contains control circuit 10B extending between the positive voltage bus 20 and output terminal 62. Semiconductor switches 64 and 66 extend between output terminals 60 and 62, respectively, and negative voltage bus 22. Right wheel motor 12A is connected between output terminals 60 and 62. The elements of control circuits 10A and 10B are identified by the same numerals as in FIG. 1. Left wheel motor 12B has a bridge configuration similar to that for right wheel motor 12A, that is not shown in detail in FIG. 2.

The power supply 14 for the wheelchair may comprise two series connected 12 volt batteries connected through reverse voltage protection device 26 to on-off switch 24 in input circuitry 68 for the wheelchair drive. On-off switch 24 is connected through conductor 20 and maximum speed potentiometer 29 to potentiometer element 28. Conductor 67 contains a meter 69 for indicating the supply of power to input circuitry 68 and the condition of battery 14. The wheelchair may be quadrature controlled by a joy stick that is moved forward by the occupant to move the chair forward, moved to the right, to steer the chair to the right, etc. Thus, potentiometer element 28 is coupled to the joy stick 69 so that the movement of the joy stick moves the wipers of the potentiometers along the resistive elements. Potentiometer element 28R includes potentiometer 28-1 that controls the rotation of right wheel motor 12A in the forward direction and potentiometer 28-2 that controls rotation of right wheel motor 12A in the reverse direction. Potentiometer element 28L includes potentiometer 28-3 that controls rotation of left wheel motor 12B in the forward direction and potentiometer 28-4 that controls rotation of left wheel motor 12B in the reverse direction.

Potentiometer elements 28L and 28R form control signal generators. The wipers of the potentiometers are connected to joy stick 69 so that the wipers of potentiometers 28-1 and 28-3 would be moved a similar amount to drive the wheelchair forward. To steer the wheelchair to the right, the joy stick moves the wiper of potentiometer 28-3 a greater amount than that of potentiometer 28-1 so that the left wheel motor 12B is driven faster than right wheel motor 12A, thus steering the chair to the right.

Each of potentiometers 28-1 through 28-4 include a resistive portion 28A and a conductive portion 28C connected to negative bus 22. Within potentiometer elements 28R and 28L, the resistive portions are oppositely arranged so that movement of joy stick 69 in a given direction moves the wiper along the resistive element 28A of one of the potentiometers and the wiper of the other potentiometer along conductive portion 28C. This insures that only one of control circuits 10A and 10B can be rendered operative at a time. Potentiometers 28-1 through 28-4 also include conductive portion 28D that provides full battery voltage as the input signal to control circuits 10A and 10B.

Resistors 70-1, 70-2, 70-3, and 70-4 are connected across potentiometers 28-1, 28-2, 28-3, and 28-4, respectively, for linearity and dissipation control, if desired. The wipers of the potentiometers 28-1, 28-2, 28-3, and 28-4 are connected through resistors 71-1, 71-2, 71-3, and 71-4, respectively, to the base of transistor 72. Resistors 71-1 through 71-4 form a summing matrix for sensing the neutral position potential of potentiometers 28-1 to 28-4 for control and/or safety purposes. Other elements such as operational amplifiers or diodes may be used, if desired.

Transistor 72 forms a portion of a time delay and zero speed latching circuit 74. The emitter of transistor 72 is connected to negative voltage bus 22. The emitter-collector circuit of transistor 72 is shunted by resistor 76 and a shunting time delay means or network comprised of resistor 80 and capacitor 82. The collector of transistor 72 is connected to bus 20 and on-off switch 24 through resistor 78 and conductor 79. The output of the time delay network is provided through diode 84 and noise limiting capacitor 85 to the base of transistor 86. the emitter of transistor 86 is connected to negative voltage bus 22. The collector of transistor 87 is connected through resistors 88 and 90 to on/off switch 24 and the positive voltage bus 20. Transistor 92 has the emitter-base junction connected across resistor 90. The collector provides an output signal in conductor 94 through indicator 96, such as a light emitting diode, to semiconductor switches 64, and 66 for the control for right wheel motor 12A and the corresponding elements in the control for left wheel motor 12B.

A hold-on circuit for transistor 92 is obtained through conductor 98 connected to the collector of transistor 92. Conductor 98 contains bias resistor 100 and safety means or switch 102. Safety switch 102, that opens on impact or upset of the wheelchair, may be of the type containing a mercury globule extending between two contacts.

The output of potentiometer 28-1 is provided to control circuit 10A in conductor 104. The output of potentiometer 28-2 is provided in conductor 106 to control circuit 10B. The outputs of potentiometers 28-3 and 28-4 are provided to the corresponding portions of the control for left wheel motor 12B in conductors 108 and 110.

Semi-conductor switches 64 and 66 are similar in construction and semi-conductor switch 64 is described in detail, herein. Conductor 94 from input circuit 68 is connected through resistor 112 to the base terminal of transistor 114 in transistor switch 64 and to the base terminal of the corresponding transistor 114 in semiconductor switch 66. The emitter of transistor 114 is connected to negative voltage bus 22 and the collector is connected through resistor 116 to conductor 118 extending from output terminal 60 associated with control circuit 10A and semi-conductor switch 64. Conductor 120 extends from output terminal 62 associated with control circuit 10B and semi-conductor switch 66. The collector of transistor 114 is connected to the base of transistor 122, the emitter of which is connected to conductor 118 (120) and the collector of which is connected through resistor 124 to the negative voltage bus 22. The collector of transistor 122 is connected to the base of output transistor 126, the collector of which is connected to output terminal 60 and the emitter of which is connected to negative voltage bus 22. Three transistors are utilized in semiconductor switches 64 and 66 to provide the necessary gain and reduce "on" state voltage drops in the circuit to a minimum.

The base-emitter junction of transistor 114 is shunted by transistor 128. The emitter of transistor 128 is connected to negative voltage bus 22. The collector of transistor 128 is connected to the base of transistor 114. The base of transistor 128 in switch 64 is connected to conductor 104 and potentiometer 28-1 through resistor 130. The base of transistor 128 in switch 66 is connected to conductor 106 and potentiometer 28-2 through resistor 130. Transistors 128 have a lower intrinsic base-emitter voltage than transistors 32 in control circuits 10A and 10B. This may be accomplished by utilizing a germanium transistor for transistor 128 and silicon transistors for transistors 32 of control circuit 10A and 10B or by the use of an amplifier to drive transistors 128, or by other means.

Since right wheel motor 12A is driven in both directions, a pair a free wheeling diodes 58-1 and 58-2 are employed in the circuitry. Diode 58-1 extends between bridge output terminal 62 and negative voltage bus 22. Diode 58-2 extends between bridge output terminal 60 and negative voltage bus 22.

Diodes 58-3, and 58-4 may be provided across control circuits 10B and 10A, respectively, to prevent motor overspeeding beyond maximum potentiometer setting conditions in which motor 12A serves as a generator to charge battery 14.

Control circuits 10A and 10B include transistors 132. Transistors 132 preferably have a lower intrinsic base-emitter voltage than the transistors in control circuits 10A and 10B. This property may be obtained in transistors 132 in the same manner that they are obtained in transistor 128. The base of transistor 132 is connected through resistor 134 to the negative voltage bus 22, in each case. The emitter of transistor 132 is connected to conductor 118 (120) and the bridge terminal 60 (62). The base-emitter junction of transistor 132 is shunted by diode 136 for base-emitter reverse voltage protection. The collector of transistor 132 is connected through resistor 138 to the base of transistor 32.

The operation of the control shown in FIG. 2 is as follows. Closing on-off switch 24 energizes potentiometers 28-1 through 28-4 through maximum speed potentiometer 29. Closing switch 24 also energizes resistor 78 and conductor 76 and shunting time delay network comprised of resistor 80 and capacitor 82.

Assuming all potentiometers 28-1 through 28-4 are in the neutral position when switch 24 is closed, no control signals will appear in the wipers of the potentiometers. Transistor 86 will be rendered conductive when capacitor 82 has charged to a potential sufficient to properly bias the base-emitter junction of transistor 86.

If, however, potentiometers 28-1 through 28-4 are not in the neutral position, the motors 12A and 12B cannot be energized until the joy stick is returned to the neutral position. This prevents possible injury to the user of the wheelchair that might occur should switch 24 be closed with one or more of potentiometers 28-1 through 28-4 in a full "on" position. To accomplish this, if one or more of potentiometers 28-1 through 28-4 is advanced, a signal will be applied through the associated summing resistors 70-1 through 70-4 to the base of transistor 72. If any of the potentiometers are advanced sufficiently to overcome the low base-emitter voltage of transistor 72, transistor 72 will be rendered conductive. With transistor 72 conductive, resistor 76 is shunted, preventing charging of capacitor 82 and turn on of transistor 86 and further operation of the wheelchair drive until joy stick 69 and potentiometers are returned to the neutral position and transistor 72 is biased off. The time delay network comprised of resistor 80 and capacitor 82 insures that no turn on of transistor 86 may occur until transistor 72 has had sufficient time to determine whether all potentiometers 28-1 through 28-4 are in the neutral position.

Assuming potentiometers 28-1 through 28-4 are in the neutral position, the conduction of transistor 86 renders transistor 92 conductive through resistors 88 and 90. The conduction of transistor 92 provides a signal in conductor 98 through resistor 100 and safety switch 102 to the base of transistor 86 holding transistor 86 on and latching up transistor 92.

The conduction of transistor 92 illuminates indicator 96 indicating that joy stick 69 is in condition for operation. It also provides a signal to the base of transistors 114 in semiconductor switches 64 and 66 for motors 12A and 12B that renders transistors 122 and 126 conductive. This closes switches 64 and 66.

Assuming right wheel motor 12A is not rotating and potentiometer 28-1 is advanced. A signal will be provided in conductor 104 to the base of transistor 32 in control circuit 10A. The signal in conductor 104 will also be supplied to the base of transistor 128. As noted above, the intrinsic base-emitter voltage of transistor 128 is below that of transistor 32. This will cause transistor 128 to be rendered conductive before transistor 32. The conduction of transistor 128 renders transistors 114, 122, and 126 of semiconductor switch 64 nonconductive, opening switch 64. This prevents a short from occurring across buses 20 and 22 by the simultaneous conduction of control circuit 10A and semiconductor switch 64.

The signal applied to the base of transistor 32 in control circuit 10A energizes that circuit to commence the pulse width modulation of right wheel motor 12A. The path of energization extends from positive voltage bus 20 through control circuit 10A, output terminal 60, right wheel motor 12A, output terminal 62, and semiconductor switch 66 to negative voltage bus 22. The amount of energization, and the speed of motor 12A is controlled by the movement of potentiometer 28-1 in a manner similar to that described above in connection with control circuit 10 of FIG. 1.

To drive the motor in the reverse direction, the joy stick is moved to actuate potentiomer 28-2. A signal will be applied in conductor 106 to the inputs of semiconductor switch 66 and control circuit 10B. The signal in conductor 104 to control circuits 10A and semiconductor switch 64 will be removed by potentiometer 28-1. The removal of the signal in conductor 104 will prevent pulse energization by control circuit 10A. The removal of the signal in conductor 104 to the base of transistor 128 will render transistors 114, 122, and 126 of semiconductor switch 64 conductive, closing that switch. The signal applied to the base of transistor 128 of semiconductor switch 66 in conductor 106 will render transistors 114, 122, and 126 of that switch non-conductive, opening that switch. The signal in conductor 106 to input transistor 32 of control circuit 10B will initiate the pulse width modulation energization of right wheel motor 12A by that control circuit. The current will flow from positive voltage bus 20 through control circuit 10B, output terminal 62, motor 12A, output terminal 60, and semiconductor switch 64 to negative voltage bus 22. Since the direction of current flow through motor 12A is reversed, the direction of rotation of the motor will likewise be reversed.

The discharge of the inductive current during the intervals between the pulses when motor 12A is not being energized will occur, for the forward direction, in a current path extending from output terminal 62, semiconductor switch 66, negative voltage bus 22, diode 58-2, output terminal 60, and back to motor 12A.

Dynamic braking of right wheel motor 12A may occur when potentiometer structure 28 is operated by the joy stick so that the potentiometers 28-1 and 28-2 controlling right wheel motor 12A are returned to the neutral position. Assume right wheel motor 12A had previously been driven in the forward direction and potentiometer 28-1 is operated to return to the rest position. This will remove the signal in conductor 104 to transistor 32 in control circuit 10A and to transistor 128 in semiconductor switch 64. The removal of the signal to the base of transistor 32 of control circuit 10A inhibits operation of control circuit 10A terminating energization of the motor. The removal of the signal from the base of transistor 128 renders transistors 114, 122, and 126 conductive closing switch 64. Current will now flow as a result of the back e.m.f. of the motor in a path from output terminal 60, semiconductor switch 64, negative voltage bus 22, diode 58-1, and output terminal 62 back to motor 12A. This produces a braking torque to slow the motor to the stop condition.

The provisions of dynamic braking to motor 12A rotating in the reverse direction occurs in an analogous manner. Further, if the motor is at rest, any attempt to rotate the motor, for example by the wheelchair being on an incline will be resisted by dynamic braking. This is due to the fact that both semiconductor switches 64 and 66 will be conductive so that if the motor is rotated in either direction, a current path exists through the appropriate switch and diode that will provide the dynamic braking.

If switch 102 should open, due to impact or upset of the wheelchair, transistor 92 will be deenergized and the signal removed from conductor 94. This will open both semiconductor switches 64 and 66. If one of control circuit 10A and 10B is operating, it will cease to energize motor 12A. Joy stick 69 must be moved to a neutral position to restart the control.

Transistors 132 are utilized as a protective means under dynamic braking conditions. Motor 12A may be rotating in, for example, the forward direction with potentiometer 28-1 and 28-2 in the neutral position; due to the wheelchair being on an incline. Control circuits 10A and 10B will be non-conductive. The voltage drop across diode 58-1, caused by the dynamic braking will be applied across the emitterbase junction of transistor 32 in control circuit 10B. This voltage could be sufficient to render transistor 32 conductive, turning on control circuit 10B. This would cause a direct short circuit across the voltage bus 20 and 22 through transistors 52, 44, and 32 of control circuit 10B and transistors 126, 122, and 114 of semiconductor switch 66. This occurs because potentiometer 28-1 is in the neutral position and potentiometer 28-2 has not been advanced to render semiconductor switch 64 non-conductive.

Under these circumstances, transistor 132, having a low intrinsic base-emitter voltage, will be rendered conductive through resistor 134. This shorts the base-emitter junction of transistor 32 rendering the reverse control circuit 10B inoperative and preventing any possibility of a short circuit. Resistor 138 limits this shunting action should it be desirable to energize motor 12A in its reverse direction by advancing potentiometer 28-2. This overcomes the shunting action applied to transistor 32, but safely renders transistor 128 conductive so that transistors 126, 122, and 114 are non-conductive. The advancement of potentiometer 28-2 initiates the reverse torque energization braking action of motor 12A, described above.

Operation of the joy stick may be used to provide power braking action to motor 12A to, for example, retard the coasting action of the chair either to stop more quickly or to slow down the speed of the chair in a controlled fashion while going down a hill or ramp. Under these conditions, the joy stick may be operated to drive the motor in the opposite direction from the one in which it is rotating. For example, if the wheelchair is moving forward, the joy stick may be operated to the extent desired in the reverse direction to deactivate potentiometer 28-1 and actuate potentiometer 28-2.

When this occurs, the signal in conductor 104 is removed and a signal in conductor 106 is established. The removal of the signal in conductor 104 inhibits operation of forward control circuit 10A. It renders semiconductor switch 64 closed. The signal in conductor 106 renders reverse control circuit 10B operative and renders transistor switch 66, non-conductive. Motor 12A, rotating in the forward direction is thus energized by pulse width modulation in a direction that would drive it in the reverse direction. The energizing current flows from positive voltage bus 20, reverse control circuit 10B, output terminal 62, motor 12A, output terminal 60, and semiconductor switch 64 to negative voltage bus 22. This current provides a retarding torque to motor 12A. The amount of this retarding torque can be determined by the position of potentiometer 28-2 so that the motor may be slowed at a desired rate or even reversed in direction up to full speed. The inductive energy of the motor is discharged, between the pulses, in a path from output terminal 60, semiconductor switch 64, negative voltage bus 22, diode 58-1, output terminal 62, and motor 12A in the same direction as the energizing current.

The components of control circuits 10A and 10B may be sized to handle the currents generated during such braking, as well as those generated under locked rotor conditions.

I claim:

1. A control circuit providing pulse width modulated energization to a load from a d.c. power source comprising:

a pair of input terminals connectable to the d.c. source;

a pair of output terminals connectable to the load;

control means providing a control signal;

a first controllable semiconductor current conduction means having a pair of power terminals and a control terminal arranged in a first polarity configuration, said control terminal controlling the flow of current through said power terminals, one of said power terminals being connected through a first bias means to one of said input terminals, the other of said power terminals being connected to one of said output terminals, said control terminal being coupled to said control means;

a second controllable semiconductor current conduction means having a pair of power terminals and a control terminal arranged in a second polarity configuration complementary to said first configuration, said control terminal controlling the flow of current through said power terminals, one of said power terminals being connected to said one of said input terminals, the other of said power terminals being connected through a second bias means to said one of said output terminals, said second bias means providing a voltage responsive to the current through it, said control terminal being connected intermediate said first bias means and said one of said power terminals of said first controllable current conduction means for rendering said second current conduction means conductive when said first current conduction means is conductive;

a third controllable semiconductor current conduction means having a pair of power terminals and a control terminal arranged in said first polarity configuration, said control terminal controlling the flow of current through said power terminals, one of said power terminals being connected to said one of said input terminals, the other of said power terminals being connected to said one of said output terminals, said control terminal being connected intermediate said second bias means and said other power terminal of said second controllable current conduction means for rendering said third current conduction means conductive when said second current conduction means is conductive, said second bias means being connected in parallel between said control terminal and said other power terminal of said third controllable current conduction means so that the voltage across said second bias means is limited by the voltage drop across said control and other power terminal;

coupling means extending from the common connection of said other power terminal of said second current conduction means and said second bias means to the control terminal of said first current conduction means for providing a feedback signal determined by the limited voltage drop across said second bias means to said first current conduction means for driving said current conduction means into saturation for a period determined by the magnitude of the control signal; and means connecting the other of said input and output terminals together.

2. The control circuit according to claim 1 wherein said coupling means comprises capacitive means.

3. The control circuit according to claim 1 wherein said control means comprises a potentiometer.

4. The control circuit according to claim 3 wherein said potentiometer is connected across said input terminals.

5. The control circuit according to claim 3 including a resistance interposed between the control terminal of said first controllable current conduction means and said potentiometer.

6. The control circuit according to claim 1 wherein said controllable current conduction means comprise transistors having emitter-collector power terminals and base control terminals.

7. The control circuit according to claim 1 further defined as a circuit for energizing an inductive load and wherein said circuit includes a diode across said output terminals for discharging the inductive energy of the load.

8. The control circuit according to claim 1 further defined as a circuit for energizing a load comprising a motor.

9. The control circuit according to claim 1 including means for controlling the duration of feedback of said coupling means.

10. The control circuit according to claim 2 including means for controlling the discharge rate of said capacitive means.

11. The control circuit according to claim 1 wherein said input and output terminals are connected in a bridge configuration having arms connecting each of said input terminals with each of said output terminals, wherein a pair of control circuits, as defined in claim 1, are incorporated in the arms of said bridge configuration to selectively provide bi-directional current flow through said load and wherein said control means is further defined as selectively energizing one or the other of said control circuits in said bridge configuration arms.

12. The control circuit according to claim 11 wherein the arms of said bridge configuration not incorporating said control circuits incorporate switch elements selectively operable by said control means in coordination with said control circuits for providing the bi-directional current flow through said load.

13. The control circuit according to claim 12 wherein said switch elements include at least one controllable current conduction means having the power terminals connected in the bridge arm and the control terminal coupled to said control means.

14. The control circuit according to claim 12 wherein said control circuit is further defined as energizing a load comprising a motor.

15. The control circuit according to claim 12 including a pair of bridge configurations as defined in claim 12 and wherein said control means is further defined as selectively energizing the control circuits of one or both of said bridge configurations.

16. The control circuit according to claim 15 wherein said control circuits are further defined as energizing loads comprising motors, one of said motors being connected across the output terminals of each of said bridge configurations.

17. The control circuit according to claims 14 or 15 wherein said control means includes a movable actuator for operating said control means to provide the control signals to the control circuits in said bridge configurations and wherein said control means includes means for sensing when said actuator is in a predetermined position for controlling the provision of the control signal in accordance therewith.

18. The control circuit according to claim 17 wherein said control means includes a time delay means interposed between said sensing means and the signal generating portions of said control means.

19. The control circuit according to claims 14 and 15 wherein said control means includes means for denergizing said control circuits responsive to motion related occurrences.

20. The control circuit according to claim 12 wherein said control means is further defined as capable of selectively, simultaneously closing both of said switch elements.

21. The control circuit according to claim 12 wherein said control circuits and switch elements incorporated in the arms of said bridge configuration are so constructed that said switch elements are operated at lower control signal levels than said control circuits.

22. The control circuit according to claim 12 wherein said bridge configuration includes diodes across said switch elements.

23. The control circuit according to claim 22 wherein the control circuits incorporated in the arms of said bridge configurations include protective means for protecting said control circuits against operation by voltages generated in said diodes.

24. The control circuit according to claim 23 wherein said protective means is coupled to the control terminal of said first controllable current conduction means of said control circuits.

25. The control circuit according to claim 12 wherein said bridge configuration includes diodes across said control circuits.

26. The control circuit according to claim 12 wherein said control means includes a control signal generator for each of said control circuits and wherein said control signal generators are so constructed that only one control signal generator at a time may provide a control signal.

27. The control circuit according to claim 26 wherein said control signal generator comprises a pair of potentiometers each having wipers movable along an element having a resistive portion and a conductive portion, said potentiometers being coupled to a common actuator for relatively moving said wipers with respect to said elements such that movement of the actuator in a given direction moves the wiper along the resistive portion of one potentiometer and the conductive portion of the other potentiometer.

28. The control circuit according to claim 27 wherein said potentiometers have a second conductive portion in said elements for providing the d.c. power source voltage as the control signal.

29. The control circuit according to claim 1 wherein said first bias means comprises a resistor.

30. The control circuit according to claim 1 wherein said second bias means comprises a resistor.

31. The control circuit according to claim 1 wherein said transistors are formed of the same semiconductor material.

32. The control circuit according to claim 34 wherein said transistors are formed of silicon semiconductor material.

33. The control circuit according to claim 15 wherein said control means includes a control signal generator for each of said control circuits and wherein said control signal generators are so constructed that only one control signal generator at a time in each bridge configuration may provide a control signal.

* * * * *